United States Patent
Cho (10) Patent No.: US 10,588,452 B2
(45) Date of Patent: Mar. 17, 2020

(54) COOKING APPLIANCE

(71) Applicants: GUANGDONG MIDEA KITCHEN APPLIANCES MANUFACTURING CO., LTD., Foshan (CN); MIDEA GROUP CO., LTD., Foshan (CN)

(72) Inventor: Jae man Cho, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

(*) Notice: Subject to any disclaimer, the term of this patent is extended or adjusted under 35 U.S.C. 154(b) by 362 days.

(21) Appl. No.: 15/610,646

(22) Filed: Jun. 1, 2017

(65) Prior Publication Data
US 2018/0279823 A1 Oct. 4, 2018

(30) Foreign Application Priority Data
Mar. 28, 2017 (CN) .......................... 2017 1 0194057

(51) Int. Cl.
H05B 6/64 (2006.01)
H05B 6/80 (2006.01)
A47J 36/02 (2006.01)
A47J 27/00 (2006.01)

(52) U.S. Cl.
CPC ........... *A47J 36/027* (2013.01); *A47J 27/002* (2013.01); *A47J 27/004* (2013.01); *H05B 6/6414* (2013.01)

(58) Field of Classification Search
CPC ...... A47J 36/027; A47J 27/004; A47J 27/002; H05B 6/6414

USPC ....... 219/757, 756, 679, 702, 720, 722, 739, 219/762, 763, 719, 715
See application file for complete search history.

(56) References Cited

U.S. PATENT DOCUMENTS 6,759,636 B2 * 7/2004 Stutman ................... B60N 3/16
219/679

FOREIGN PATENT DOCUMENTS

| CN | 2672153 Y | 1/2005 |
|---|---|---|
| CN | 1737431 A | 2/2006 |
| CN | 103062809 A | 4/2013 |
| CN | 103672986 A | 3/2014 |
| CN | 104654378 A | 5/2015 |
| CN | 205546023 U | 8/2016 |
| DE | 8900624 U1 | 3/1989 |
| JP | 2007107739 A | 4/2007 |

OTHER PUBLICATIONS

Translation of CN205546023, Aug. 31, 2016, A portable microwave oven, European Patent Office. (Year: 2016).*

* cited by examiner

*Primary Examiner* — Quang T Van
(74) *Attorney, Agent, or Firm* — Kilpatrick Townsend & Stockton, LLP (57) ABSTRACT

The present invention provides a cooking appliance, having a door and a base. The base has a top plate, a bottom plate, a left outer housing, a right outer housing, a front plate and a rear plate, which form an accommodating space for accommodating electric devices. Some of the electric devices are fixed to the lower surface of the top plate, and the others are fixed to the upper surface of the bottom plate.

9 Claims, 6 Drawing Sheets

COOKING APPLIANCE

CROSS-REFERENCES TO RELATED APPLICATIONS

The present application claims the benefit of and priority to Chinese Patent Application No. 201710194057.3, filed Mar. 28, 2017, the entire disclosure of which is incorporated herein by reference.

TECHNICAL FIELD

The present invention relates to the field of household appliances, and more specifically to a cooking appliance.

BACKGROUND

With the development of the times, the types of cooking appliances become more and more diverse. At present, there emerges on the market a novel roasting cooking appliance that may be used for heating papagni type food, sandwiches, etc. A cooking appliance comprises a door and a base. The door is hinged to the base and may be turned up and down. It is used to install many electric devices, such as a microwave generating device, a high-voltage transformer and a fan assembly, within the base of the cooking appliance. At present, the electric devices in the base are mostly directly fixed to the bottom plate of the base, and the weight-bearing design is unreasonable. Additionally, if the cooking appliance falls down during transportation or use, the bottom plate is liable to deform.

SUMMARY OF THE INVENTION

The present invention aims at solving at least one of the technical problems existing in the prior art.

To this end, an objective of the present invention is to provide a cooking appliance with a base of a reasonable weight-bearing structure.

To achieve the above objective, an embodiment of a first aspect of the present invention provides a cooking appliance, comprising a door and a base, the door being hinged to the base and capable of being turned up and down relative to the base, wherein the base comprises a top plate, a bottom plate, a left outer housing, a right outer housing, a front plate and a rear plate, which form an accommodating space for accommodating electric devices, some of the electric devices being fixed to a lower surface of the top plate, and the others being fixed to an upper surface of the bottom plate.

According to this solution, the weight-bearing layout of the base is optimized, i.e., some of the electric devices within the base being fixed to the bottom plate, and the others to the top plate. Support legs are disposed at positions, close to edges, of the bottom of the bottom plate. The weights of the electric devices fixed to the bottom plate are supported by the bottom plate, and the weights of these electric devices are transferred to the support legs via the bottom plate. The weights of the electric devices fixed to the top plate are supported by the top plate, and the weights of these electric devices are transferred first to top plate, and then to the support legs via the left outer housing and the right outer housing supporting the top plate thereunder. With this design, weight supported by the bottom plate is reduced; thus, the falling-resistance capability of the base may be improved; and the bottom plate may be prevented from deformation when the product falls down.

In the above technical solution, the electric devices include a fan assembly, a microwave generating device, a high-voltage transformer and a high-voltage capacitor. The fan assembly and the microwave generating device are fixedly installed on the lower surface of the top plate, and the high-voltage transformer and the high-voltage capacitor are fixedly installed on the upper surface of the bottom plate.

In this solution, the high-voltage transformer and the high-voltage capacitor are fixed to the bottom plate, and their weights are transferred to the support legs via the bottom plate. The fan assembly and the microwave generating device are fixed to the top plate, and their weights are transferred first to the top plate, and then to the support legs via the left outer housing and the right outer housing supporting the top plate thereunder, wherein the fan assembly is used to supply air to the microwave generating device and the high-voltage transformer so as to cool the microwave generating device and the high-voltage transformer.

In any above technical solution, an installation position of the microwave generating device is close to the center of the lower surface of the top plate, and installation positions of the high-voltage transformer and the high-voltage capacitor are close to the center of the upper surface of the bottom plate.

In this solution, the microwave generating device is installed close to the center to the top plate, and the high-voltage transformer and the high-voltage capacitor are installed close to the center of the bottom plate, leading to more compact arrangement of the electric devices within the base and optimized space utilization, and thus the overall size of the base is reduced.

In any above technical solution, the left outer housing and/or the right outer housing is provided with a window. The window is opposite the high-voltage transformer, the high-voltage capacitor and the microwave generating device.

According to this solution, the left outer housing and/or the right outer housing is provided with a window. The position of the window is aligned to the high-voltage transformer, the high-voltage capacitor and the microwave generating device. Thus, such major electric devices as the high-voltage transformer, the high-voltage capacitor and the microwave generating device may be inspected and maintained via the window without completely disassembling the base. Such a design may reduce the workload of product maintenance, thus improving the efficiency of maintenance.

In any above technical solution, a cover plate is detachably installed at the position of the window and used for closing the window.

According to this solution, the cover plate is installed at the position of the window to close the window, thus preventing a user from contacting the electric devices within the base via the window and protecting the user against electric shock. Such a design improves the safety of the product. In maintaining, the cover plate is detached to allow inspection and maintenance to such major electric devices as the high-voltage transformer, the high-voltage capacitor and the microwave generating device.

In any above technical solution, the cooking appliance also comprises an air director that is fixedly installed on the lower surface of the top plate and located behind the microwave generating device. The fan assembly is installed in front of the microwave generating device.

In this solution, the fan assembly is installed in front of the microwave generating device, and the air director is installed behind the microwave generating device. The air director guides airflow after cooling the microwave generating device out of the base for emission, such that the temperature within the base is reduced, thus improving the cooling effect of the product.

In any above technical solution, one portion of cold air blown from the fan assembly flows past the microwave generating device, and the other portion of the cold air flows past the high-voltage transformer.

In this solution, one portion of cold air blown from the fan assembly flows past the microwave generating device, and the other portion of the cold air flows past the high-voltage transformer, such that the microwave generating device and the high-voltage transformer are both directly cooled by the cold air blown from the fan assembly, thereby guaranteeing a favorable effect of cooling both the microwave generating device and the high-voltage transformer by means of the fan assembly.

In any above technical solution, the cooking appliance also comprises a holder. The high-voltage transformer and the high-voltage capacitor are installed on the holder and the holder is fixedly installed on the bottom plate.

In this solution, the high-voltage transformer and the high-voltage capacitor are fixed to the bottom plate by means of the holder, and the high-voltage transformer and the high-voltage capacitor are installed on the holder, such that the high-voltage transformer, the two high-voltage capacitor and the holder are integrated. With this design, the force bearing area between the electric devices and the bottom plate, is reduced, and weight distribution is more uniform. Also, the stiffness of the holder may reduce the impact of the high-voltage transformer and the high-voltage capacitor on the bottom plate when the product falls down, and therefore, the falling-resistance performance of the product is greatly improved.

According to one embodiment of the present invention, two microwave generating devices, two high-voltage transformers, two high-voltage capacitors and two air directors are provided, and the two microwave generating devices and the two air directors are disposed symmetric about a center line of the top plate in a left-and-right direction, respectively, and the two high-voltage transformers and the two high-voltage capacitors are disposed symmetric about a center line of the bottom plate in the left-and-right direction, respectively.

In this solution, the two microwave generating devices and the two air directors are disposed symmetric about the center line of the top plate in the left-and-right direction, leading to more uniform weight distribution of the devices on the top plate to prevent deformation of the top plate when the product falls down. Likewise, the two high-voltage transformers and the two high-voltage capacitors are disposed symmetric about a center line of the bottom plate in the left-and-right direction, leading to more uniform weight distribution of the devices on the bottom plate to prevent deformation of the bottom plate when the product falls down.

In any above technical solution, the left outer housing is provided with a first window that is opposite the high-voltage transformer, the high-voltage capacitor and the microwave generating device located on the left, and a first cover plate is detachably installed at the position of the first window. The right outer housing is provided with a second window that is opposite the high-voltage transformer, the high-voltage capacitor and the microwave generating device located on the right, and a second cover plate is detachably installed at the position of the second window.

According to this solution, the left outer housing and the right outer housing are provided with the windows, respectively, thus to allow inspection and maintenance to such major electric devices as the high-voltage transformers, the high-voltage capacitors and the microwave generating devices on the left and right. As a result, the efficiency of product maintenance is greatly improved.

The additional aspects and advantages of the present invention will become apparent in the following part of description, or may be understood through the practice of the present invention.

BRIEF DESCRIPTION OF THE DRAWINGS

The above and/or additional aspects and advantages of the present invention will become apparent and easily understandable from the description of embodiments in conjunction with the following accompanying drawings, in which.

Figure 1:
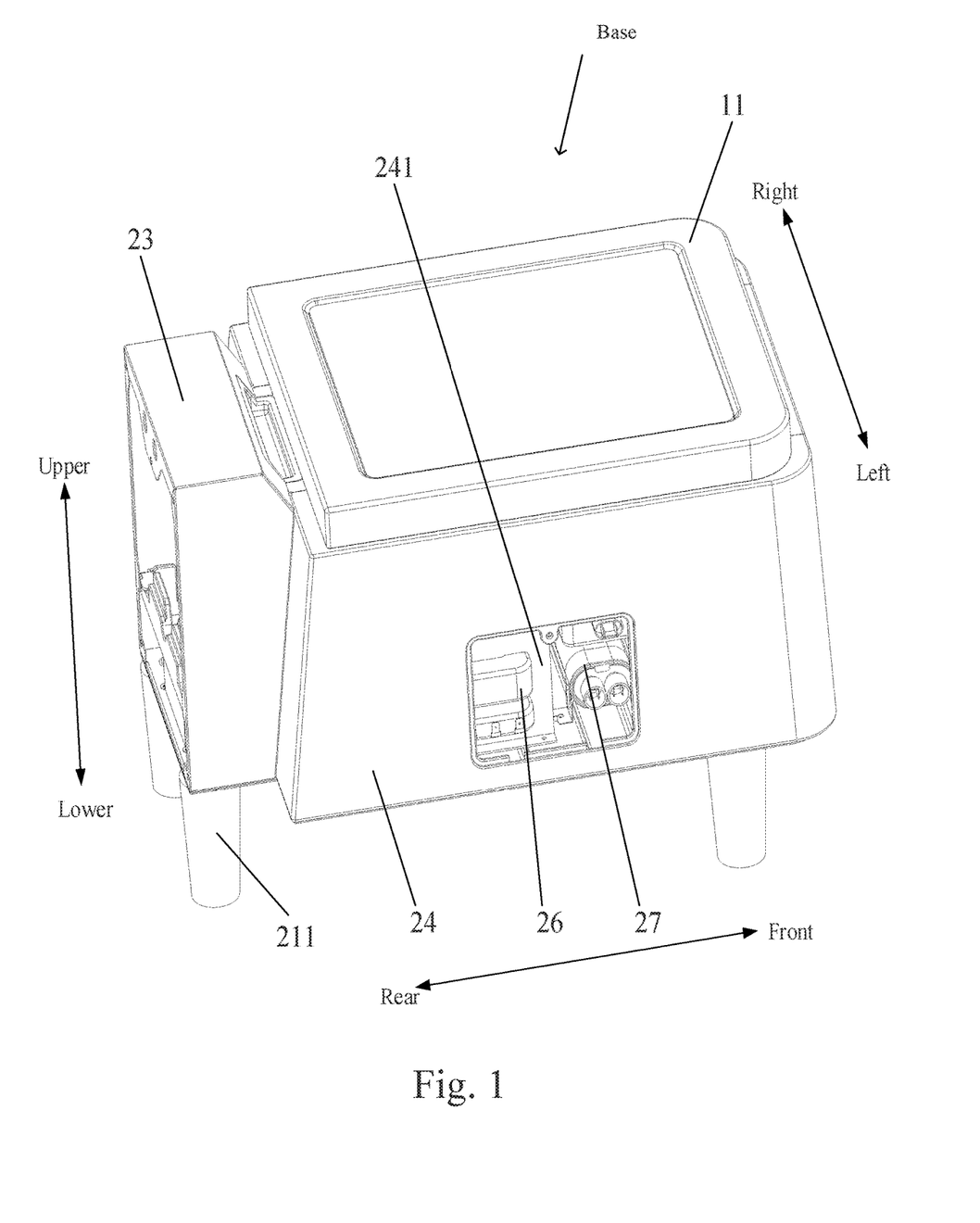
FIG. 1 is a structural schematic view of a base provided by one embodiment of the present invention.
Figure 2:
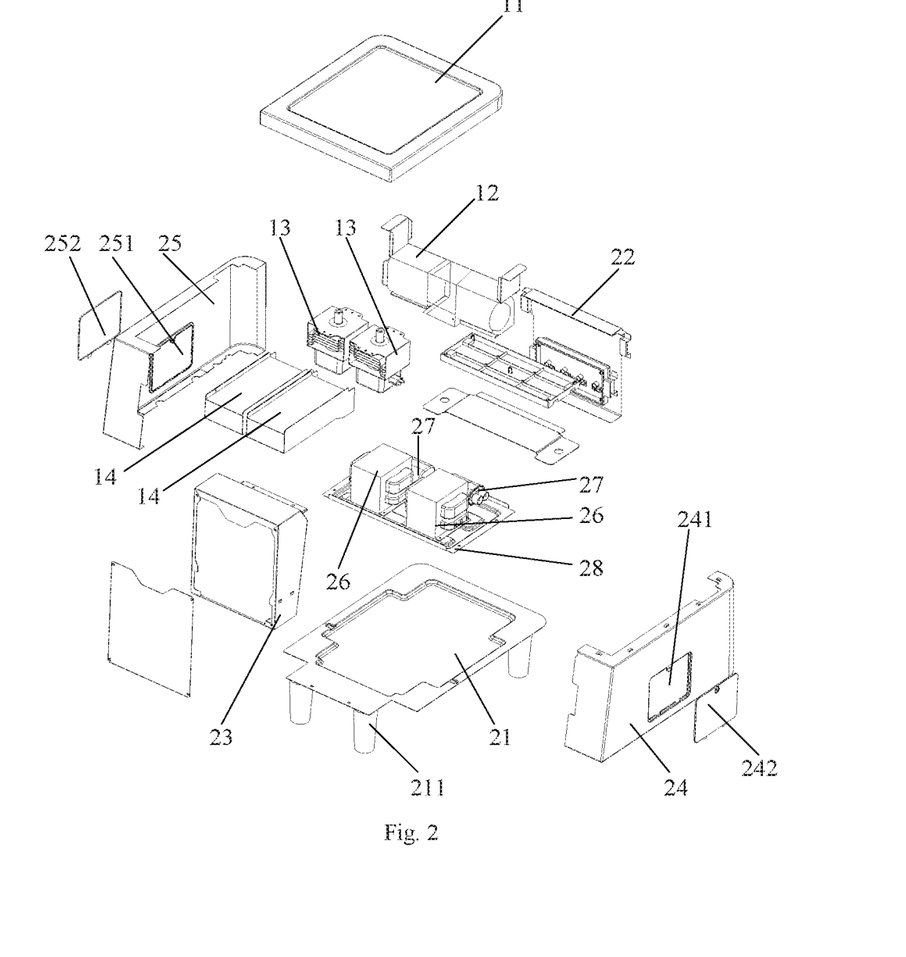
FIG. 2 is an exploded view of a base provided by one embodiment of the present invention.
Figure 3:
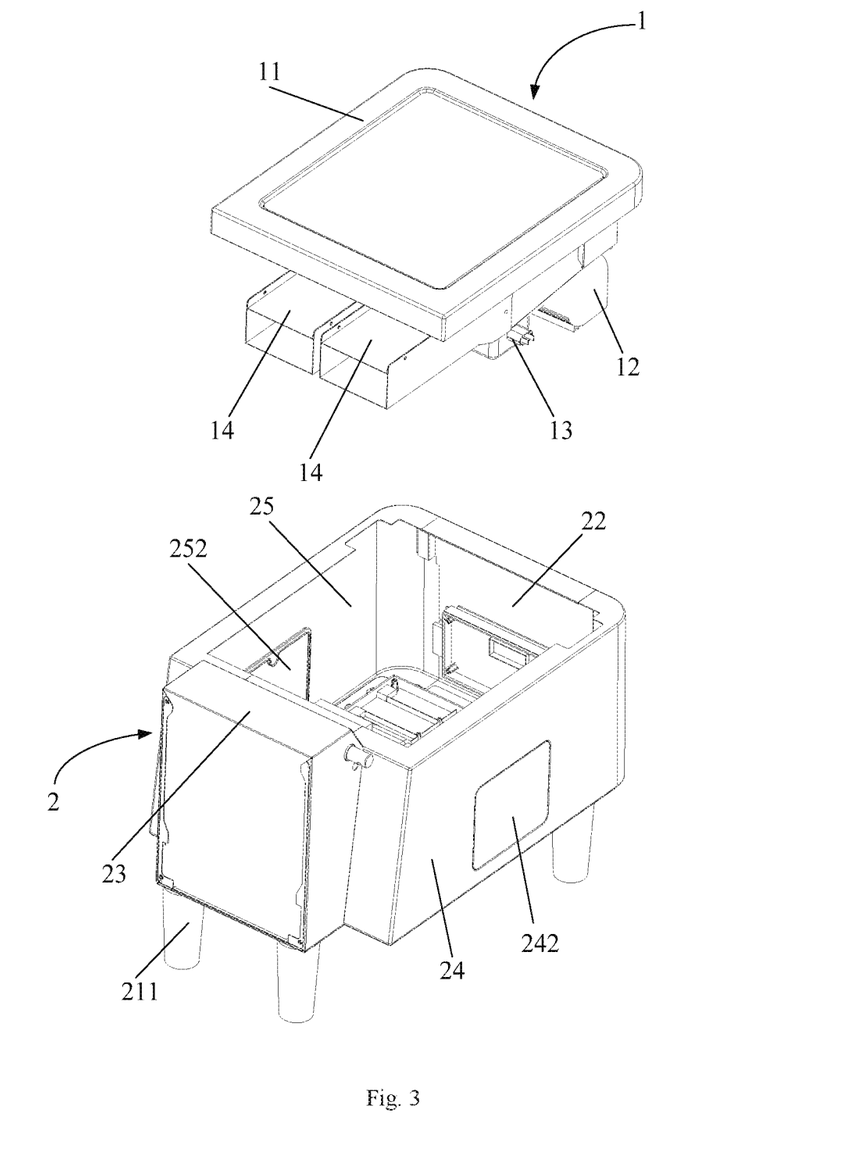
FIG. 3 shows structural schematic views of a top assembly and a bottom assembly of the base shown in FIG. 2 that are assembled, respectively.
Figure 4:
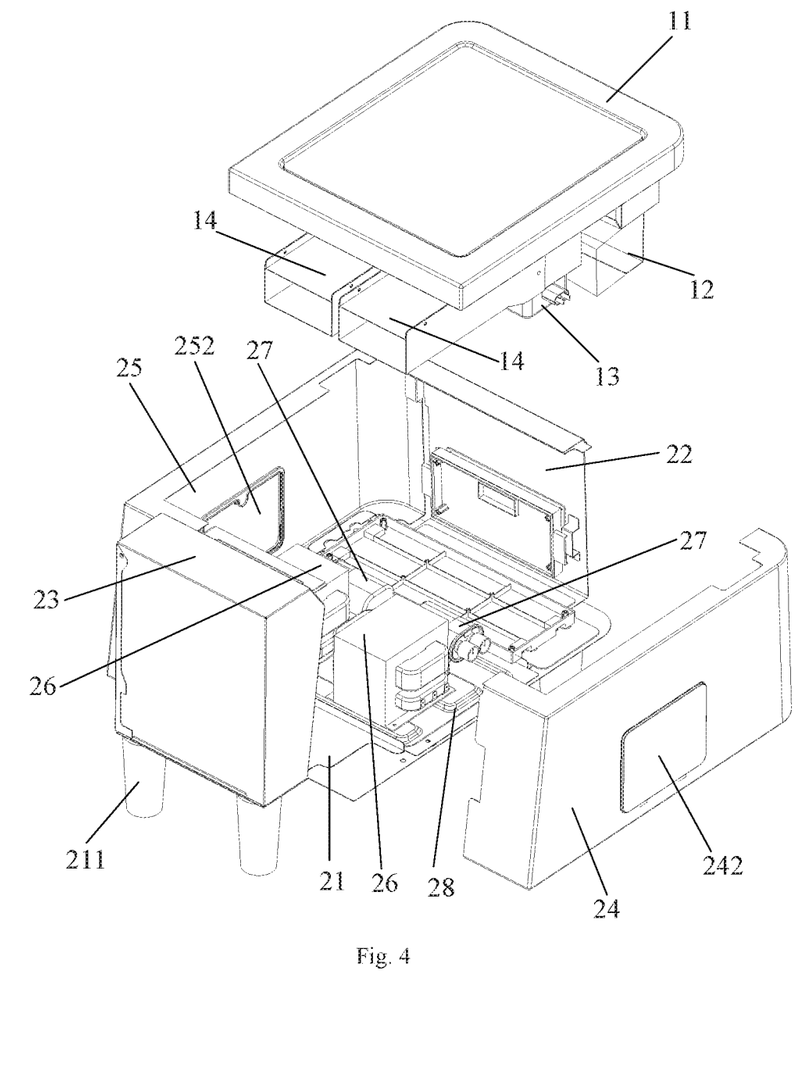
FIG. 4 is a schematic view of an internal structure of the base shown in FIG. 3.
Figure 5:
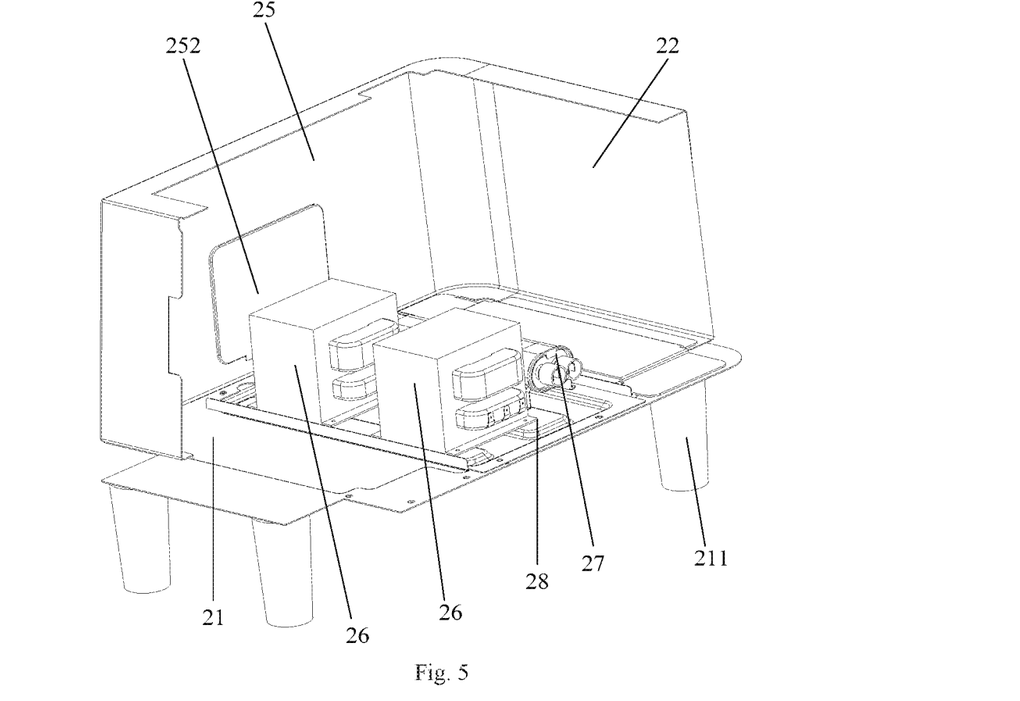
FIG. 5 is a schematic view of installation positions of high-voltage transformers and high-voltage capacitors shown in FIG. 4.
Figure 6:
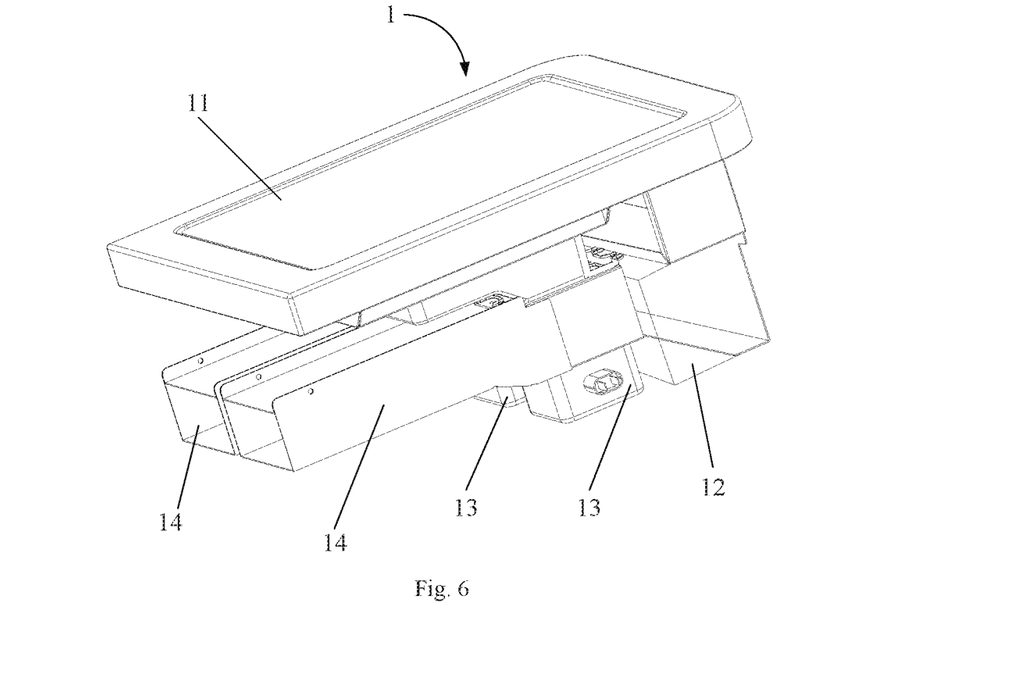
FIG. 6 is a structural schematic view of the top assembly shown in FIG. 2.
Figure 7:
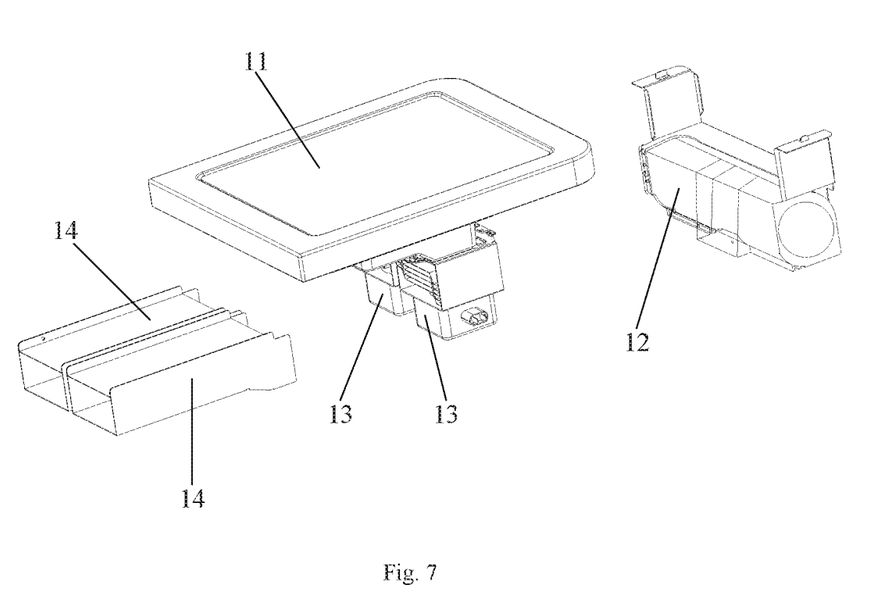
FIG. 7 is a structural view of an assembled structure of the top assembly shown in FIG. 6.

In the drawings, the correspondence relations of reference numerals in FIGS. 1 to 7 to the names of parts are shown as follows:

1, top assembly; 11, top plate; 12, fan assembly; 13, microwave generating device; 14, air director; 2, bottom assembly; 21, bottom plate; 211, support leg; 22, front plate; 23, rear plate; 24, left outer housing; 241, first window; 242, first cover plate; 25, right outer housing; 251, second window; 252, second cover plate; 26, high-voltage transformer; 27, high-voltage capacitor; and 28, holder.

DETAILED DESCRIPTION OF THE EMBODIMENTS

To more clearly understand the above-mentioned objective, features and advantages of the present invention, the present invention will be further described in detail in conjunction with the accompanying drawings and specific embodiments. It needs to be noted that the embodiments of the present application and features in the embodiments may be combined with one another without conflict.

Many specific details are set forth in the following description in order to fully understand the present invention. However, the present invention may also be implemented in other modes than those described herein. Therefore, the scope of protection of the present invention shall not be limited by the following disclosed specific embodiments.

An embodiment of the present invention provides a cooking appliance which may be used for heating papagni type food, sandwiches, etc. The cooking appliance comprises a door and a base. The door is hinged to the base and can be turned up and down relative to the base. The base comprises a top plate, a bottom plate, a left outer housing, a right outer housing, a front plate and a rear plate, which form an accommodating space for accommodating electric devices. Some of the electric devices are fixed to the lower surface of the top plate, and the others are fixed to the upper surface of the bottom plate. According to this solution, the weight-bearing layout of the base is optimized, i.e., some of the electric devices within the base being fixed to the bottom plate, and the others to the top plate; with this design, weight supported by the bottom plate is reduced; thus, the falling-resistance capability of the base is improved; and the bottom plate is prevented from deformation when the product falls down. Using this solution, the layout of the electric devices within the base of the cooking appliance is improved; under the premise of guaranteeing maximized space utilization, the weight-bearing layout of the base is optimized and the falling-resistance capability of the product is improved while ensuring favorable heat dissipation effect of the base, thereby allowing the product to have outstanding performance in the three aspects of space utilization, falling-resistance and heat dissipation and also to be greatly improved in overall performance.

According to an embodiment of the present invention, as shown in FIGS. 1 to 7, the base of the cooking appliance comprises a top assembly 1 and a bottom assembly 2. The top assembly 1 comprises a top plate 11 and a fan assembly 12 fixedly installed on the lower surface of the top plate 11, two microwave generating devices 13 and two air directors 14. The bottom assembly 2 comprises a bottom plate 21, a front plate 22 installed at the front end of the bottom plate 21, a rear plate 23 installed at the rear end of the bottom plate 21, an outer housing 24 installed at the left end of the bottom plate 21, a right outer housing 25 installed at the right end of the bottom plate 21, and two high-voltage transformers 26 and two high-voltage capacitors 27 that are fixedly installed on the upper surface of the bottom plate 21. Support legs 211 are disposed at both left and right ends of the lower surface of the bottom plate 21, respectively, with the support legs 211 at the left end being close to the left outer housing 24 and the support legs 211 at the right end being close to the right outer housing 25. The left and right ends of the top plate 11 are fixedly connected to the left outer housing 24 and the right outer housing 25, respectively.

According to this solution, the base is divided into two parts, the top assembly 1 and bottom assembly 2. The bottom assembly 2 comprises the bottom plate 21, the front plate 22, the rear plate 23, the left outer housing 24, the right outer housing 25, two high-voltage transformers 26 and two high-voltage capacitors 27. The front plate 22, the rear plate 23, the left outer housing 24, the right outer housing 25 are connected around the bottom plate 21, respectively, and located above the support legs 211 of the bottom plate 21. The weights of the front plate 22, the rear plate 23, the left outer housing 24 and the right outer housing 25 are directly transferred to the support legs 211 from top to bottom. The two high-voltage transformers 26 and the two high-voltage capacitors 27 are installed on the bottom plate 21, and their weights are supported by the bottom plate 21. The weights of the two high-voltage transformers 26 and the two high-voltage capacitors 27 are transferred to the support legs 211 via the bottom plate 21. The top assembly 1 comprises a fan assembly 12, two microwave generating devices 13 and two air directors 14. The fan assembly 12, the two microwave generating devices 13 and the two air directors 14 are fixedly installed on the top plate 11, and their weights are supported by the top plate 11. The left and right ends of the top plate 11 are fixedly connected to the left outer housing 24 and the right outer housing 25, such that the weights of the fan assembly 12, the two microwave generating devices 13 and the two air directors 14 are transferred first to the top plate 11, and then to the support legs 211 via the left outer housing 24 and the right outer housing 25 supporting the top plate 11 thereunder. Using this solution, the weight-bearing layout of the base is optimized; that is, the electric devices within the base are divided into two groups, with one group being installed on the bottom plate 21 and the other group being installed on the top plate 11; thus, the weight supported by the bottom plate 21 is decreased so as to improve the falling-resistance capability of the base and to prevent deformation of the bottom plate 21 when the product falls down.

Specifically, in assembling of the base, the top assembly 1 and the bottom assembly 2 are assembled first, respectively, and then the top assembly 1 is installed at the top of the bottom assembly 2, thus completing the assembling of the base.

In the above embodiment, the installation positions of the two microwave generating devices 13 are close to the center of the lower surface of the top plate 11; the two air directors 14 are installed behind the two microwave generating devices 13 and opposite the two microwave generating devices 13, respectively; the fan assembly 12 is installed in front of the two microwave generating devices 13; the left half of the fan assembly 12 is opposite the microwave generating device 13 located on the left, and the right half of the fan assembly 12 is opposite the microwave generating device 13 located on the right; and the fan assembly 12, the two microwave generating devices 13 and the air directors 14 are disposed symmetric about the center line of the top plate 11 in the left-and-right direction, respectively.

In this solution, the two microwave generating devices 13 are installed close to the center of the top plate 11, and the fan assembly 12 and the air directors 14 are installed at both front and rear ends of the microwave generating devices 13, respectively, leading to more compact arrangement of the electric devices within the base and optimized space utilization, and thus the overall size of the base is reduced. The fan assembly 12, the two microwave generating devices 13 and the two air directors 14 are disposed symmetric about the center line of the top plate 11 in the left-and-right direction, respectively, leading to more uniform weight distribution of the electric devices on the top plate 11 to prevent deformation of the top plate 11 when the product falls down.

In the above embodiment, the installation positions of the two high-voltage transformers 26 and the two high-voltage capacitors 27 are close to the center of the upper surface of the bottom plate 21; the two high-voltage transformers 26 and the two high-voltage capacitors 27 are disposed symmetric about the center line of the bottom plate 21 in the left-and-right direction, respectively; and the positions of the two high-voltage transformers 26 are behind the fan assembly 12.

In this solution, the installation positions of the two high-voltage transformers 26 and the two high-voltage capacitors 27 are close to the center of the bottom plate 21, leading to more compact arrangement of the electric devices within the base and optimized space utilization, and thus the overall size of the base is reduced. Two high-voltage transformers 26 and the two high-voltage capacitors 27 are disposed symmetric about the center line of the bottom plate 21 in the left-and-right direction, respectively, leading to more uniform weight distribution of the electric devices on the bottom plate 21 to prevent deformation of the top plate 21 when the product falls down.

In the above embodiment, a holder 28 is installed on the bottom plate 21, and the two high-voltage transformers 26 and the two high-voltage capacitors 27 are installed on the holder 28.

In this solution, the high-voltage transformers 26 and the high-voltage capacitors 27 are fixed to the bottom plate 21 by means of the holder 28. The two high-voltage transformers 26 and the two high-voltage capacitors 27 are installed on the holder 28, such that the high-voltage transformers 26, the two high-voltage capacitors 27 and the holder 28 are integrated. With this design, the force bearing area between the electric devices and the bottom plate 21 is reduced, and weight distribution is more uniform. Also, the stiffness of the holder 28 may reduce the impact of the high-voltage transformers 26 and the high-voltage capacitors 27 on the bottom plate 21 when the product falls down, and therefore, the falling-resistance performance of the product is greatly improved.

In the above embodiment, one portion of cold air blown from the left half of the fan assembly 12 flows past the microwave generating device 13 located on the left, and the other portion of the cold air flows past the high-voltage transformer 26 located on the left; one portion of cold air blown from the right half of the fan assembly 12 flows past the microwave generating device 13 located on the right, and the other portion of the cold air flows past the high-voltage transformer 26 located on the right.

Within the base provided by this solution, the fan assembly 12 is installed in front of the microwave generating devices 13 and the high-voltage transformers 26. The left half of the fan assembly 12 is opposite the left microwave generating device 13, and one portion of the cold air blown from the left half of the fan assembly 12 flows past the left microwave generating device 13, and the other portion of the cold air flows past the left high-voltage transformer 26 to cool them. The right half of the fan assembly 12 is opposite the right microwave generating device 13, and one portion of cold air blown from the right half of the fan assembly 12 flows past the right microwave generating device 13, and the other portion of the cold air flows past the right high-voltage transformer 26 to cool them. Moreover, one air director 14 is installed behind each of the two microwave generating devices 13. The air directors 14 guide hot air flowing past the microwave generating devices 13 to an exhaust port of the base for emission. According to such a design, only one fan assembly 12 is used in the cooling system for the base, and thus the cost of the product is reduced. Further, the two microwave generating devices 13 and the two high-voltage transformers 26 are both directly cooled by cold air blown from the fan assembly 12 with a good cooling effect. Moreover, the cooling system for the base provided by this solution is compact in structure, high in space utilization, and conducive to the reduction of the size of the product.

In the above embodiment, the left outer housing 24 is provided with a first window 241 which is opposite the high-voltage transformer 26, the high-voltage capacitor 27 and the microwave generating device 13 located on the left. A first cover plate 242 is detachably installed at the position of the first window 241 and used for closing the first window 241. The right outer housing 25 is provided with a second window 251 that is opposite to the high-voltage transformer 26, the high-voltage capacitor 27 and the microwave generating device 13 located on the right. A second cover plate 252 is detachably installed at the position of the second window 251 and used for closing the second window 251.

According to this solution, the left outer housing 24 and the right outer housing 25 are provided with the windows, respectively, and the first window 241 in the left outer housing 24 is aligned to the high-voltage transformer 26, the high-voltage capacitor 27 and the microwave generating device 13 on the left, and the second window 251 in the right outer housing 25 is aligned to the high-voltage transformer 26, the high-voltage capacitor 27 and the microwave generating device 13 on the right. In maintaining of the base, it only needs to detach the cover plates on the left outer housing 24 and the right outer housing 25 to allow inspection and maintenance to such electric devices as the high-voltage transformers 26, the high-voltage capacitors 27 and the microwave generating devices 13, without completely disassembling the base. Such a design may reduce the workload of product maintenance, thus improving the efficiency of maintenance.

In the above embodiment, the rear plate 23 is provided with an exhaust port, and the two air directors 14 are communicated with the exhaust port.

In the description of the present description, it should be appreciated that orientation or positional relations indicated by the terms 'upper', 'lower', 'front', 'rear', 'left', 'right', 'top', 'bottom', 'within', 'outside' and the like are based on those shown in the figures just for the sake of convenient description of the present invention and simplified description rather than indicating or implying that the denoted devices or elements have specified orientations and may be constructed and operated in specified orientations, and thus may not be interpreted as limitations to the present invention.

In the description of the present description, the description of the terms 'one embodiment', 'some embodiments', 'specific embodiments' and the like implies that the specific features, structures, materials or characteristics described in conjunction with the embodiments or examples are included in at least one embodiment or example of the present invention. In the present description, the schematic expressions of the above-mentioned terms may not necessarily refer to the same embodiment or example. Also, the described specific features, structures, materials or characteristics may be combined in an appropriate way in any one or more embodiments or examples.

In the description of the present description, the terms 'first' and 'second' are merely used for the description purpose and cannot be interpreted as indicating or implying relative importance unless otherwise explicitly specified or defined; the terms 'connect', 'install', 'fix' and the like should all be generally interpreted. For example, the meaning of 'connect' may be fixed connection, and may also be detachable connection or integrated connection; and may be direct connection, and may also be indirect connection by means of an intermedia. Those of ordinary skill in the art may understand the specific meanings of the above-mentioned terms in the present invention in accordance with specific circumstances.

Described above are just the preferred embodiments of the present invention without limitations to the present invention. For those skilled in the art, various alterations and variations may be made to the present invention. Any modifications, equivalent replacements, improvements and the like made within the spirit and principles of the present invention shall fall into the scope of protection of the present invention.

What is claimed is:

1. A cooking appliance, comprising a base, wherein the base comprises:
    a top plate, a bottom plate, a left outer housing, a right outer housing, a front plate and a rear plate, which form an accommodating space for accommodating electric devices, some of the electric devices being fixed to a lower surface of the top plate, and the others being fixed to an upper surface of the bottom plate;

wherein the electric devices include a fan assembly, a microwave generating device, a high-voltage transformer and a high-voltage capacitor, the fan assembly and the microwave generating device being fixedly installed on the lower surface of the top plate, and the high-voltage transformer and the high-voltage capacitor being fixedly installed on the upper surface of the bottom plate.

2. The cooking appliance according to claim 1, wherein an installation position of the microwave generating device is close to the center of the lower surface of the top plate, and installation positions of the high-voltage transformer and the high-voltage capacitor are close to the center of the upper surface of the bottom plate.

3. The cooking appliance according to claim 2, wherein the left outer housing and/or the right outer housing is provided with a window; and the window is opposite the high-voltage transformer, the high-voltage capacitor and the microwave generating device.

4. The cooking appliance according to claim 3, wherein a cover plate is detachably installed at the position of the window and used for closing the window.

5. The cooking appliance according to claim 4, further comprising:

an air director that is fixedly installed on the lower surface of the top plate and located behind the microwave generating device, with the fan assembly being installed in front of the microwave generating device.

6. The cooking appliance according to claim 5, wherein two microwave generating devices, two high-voltage transformers, two high-voltage capacitors and two air directors are provided, and the two microwave generating devices and the two air directors are disposed symmetric about a center line of the top plate in a left-and-right direction, respectively, and the two high-voltage transformers and the two high-voltage capacitors are disposed symmetric about a center line of the bottom plate in the left-and-right direction, respectively.

7. The cooking appliance according to claim 6, wherein the left outer housing is provided with a first window that is opposite the high-voltage transformer, the high-voltage capacitor and the microwave generating device located on the left, with a first cover plate being detachably installed at the position of the first window; and the right outer housing is provided with a second window that is opposite the high-voltage transformer, the high-voltage capacitor and the microwave generating device located on the right, with a second cover plate being detachably installed at the position of the second window.

8. The cooking appliance according to claim 1, wherein one portion of cold air blown from the fan assembly flows past the microwave generating device, and the other portion of the cold air flows past the high-voltage transformer.

9. The cooking appliance according to claim 1, further comprising:

a holder, with the high-voltage transformer and the high-voltage capacitor being installed on the holder and the holder being fixedly installed on the bottom plate.

\* \* \* \* \*